(12) United States Patent
Woundy et al.

(10) Patent No.: US 8,255,924 B2
(45) Date of Patent: *Aug. 28, 2012

(54) SYSTEM AND METHOD FOR PROVIDING AN APPLICATION TO A DEVICE

(75) Inventors: Richard M. Woundy, North Reading, MA (US); Manoj Chaudhari, Dayton, NJ (US); Raju Datla, Cherry Hill, NJ (US); Eugene Lee, Malvern, PA (US); Srinivas Bongoni, King of Prussia, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/907,060

(22) Filed: Oct. 19, 2010

(65) Prior Publication Data

US 2011/0035457 A1 Feb. 10, 2011

Related U.S. Application Data

(63) Continuation of application No. 11/625,422, filed on Jan. 22, 2007, now Pat. No. 7,844,658.

(51) Int. Cl.
*G06F 15/163* (2006.01)
(52) U.S. Cl. ........ 719/313; 717/172; 717/173; 717/177; 717/178
(58) Field of Classification Search .................. 717/172, 717/173, 177, 178; 719/313
See application file for complete search history.

(56) References Cited

U.S. PATENT DOCUMENTS

| 6,487,602 | B1 * | 11/2002 | Thakker | 709/230 |
| 7,844,658 | B2 * | 11/2010 | Woundy et al. | 709/200 |
| 7,890,427 | B1 * | 2/2011 | Rao et al. | 705/51 |
| 2006/0048155 | A1 * | 3/2006 | Wu et al. | 718/101 |
| 2006/0161626 | A1 * | 7/2006 | Cardina et al. | 709/206 |
| 2007/0065122 | A1 * | 3/2007 | Chatterton | 386/126 |
| 2007/0093243 | A1 * | 4/2007 | Kapadekar et al. | 455/419 |
| 2008/0063154 | A1 * | 3/2008 | Tamari et al. | 379/88.13 |

OTHER PUBLICATIONS

Lewis, T., "Information appliances: gadget Netopia," Computer, vol. 31, No. 1, pp. 59-68, Jan. 1998 [retrieved from http://ieeexplore.ieee.org/stamp/stamp.jsp?tp=&arnumber=641978&isnumber=13969 on Oct. 21, 2011].*

* cited by examiner

*Primary Examiner* — H. S. Sough
*Assistant Examiner* — Brian Wathen
(74) *Attorney, Agent, or Firm* — Banner & Witcoff, Ltd.

(57) ABSTRACT

The disclosed embodiments include a system and method for providing at least one electronic application to at least one device. In one embodiment, the method includes acquiring device information that relates to the device and determining whether the device supports the at least one application based on the device information. The method may further include generating an electronic message for the device wherein the message contains at least one link for acquiring the at least one application when the device supports the application.

9 Claims, 7 Drawing Sheets

SYSTEM AND METHOD FOR PROVIDING AN APPLICATION TO A DEVICE

TECHNICAL FIELD

The embodiments described herein relate to a system and method for providing an electronic application to a device.

BACKGROUND

Portable devices, such as mobile telephones and personal digital assistant (PDA) devices, provide users/customers convenience in receiving and transmitting information. These devices are typically configured to run various electronic applications including video applications, e-mail applications, and the like. However, loading these and other electronic applications onto the devices has proven to be burdensome and inefficient for the device user. For example, conventional methods of loading/downloading electronic applications include physically connecting the device to a specialized application tool, which requires the customer to return the device to the device retailer or location having the application tool. A second method includes downloading applications using the wireless application protocol (WAP) that requires the customer to navigate through a dedicated portal having successive links for initiating application download. In many cases, utilizing the WAP method requires the customer to terminate an existing call or session in order to perform the download operation. An additional method for providing an application includes a push over-the-air (POTA) method, wherein a service provider initiates an application download to the customer. However, it is commonly known that not all wireless devices (e.g., cellular telephones) support the POTA mechanism.

The embodiments described herein were conceived in view of these and other disadvantages of conventional methods for providing electronic applications.

SUMMARY

The disclosed embodiments include a system and method for providing at least one electronic application to at least one device. The method includes acquiring device information that relates to the device. The method also includes determining whether the device supports the at least one application based on the device information. The method further includes generating an electronic message for the device wherein the message contains at least one link for acquiring the at least one application when the device supports the application.

BRIEF DESCRIPTION OF THE DRAWINGS

The novel features of the described embodiments are set forth with particularity in the appended claims. These embodiments, both as to their organization and manner of operation, together with further advantages thereof, may be best understood with reference to the following description, taken in connection with the accompanying drawings in which:

DETAILED DESCRIPTION OF THE PREFERRED EMBODIMENT(S)

As required, detailed descriptions of embodiments are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art.

Figure 1:
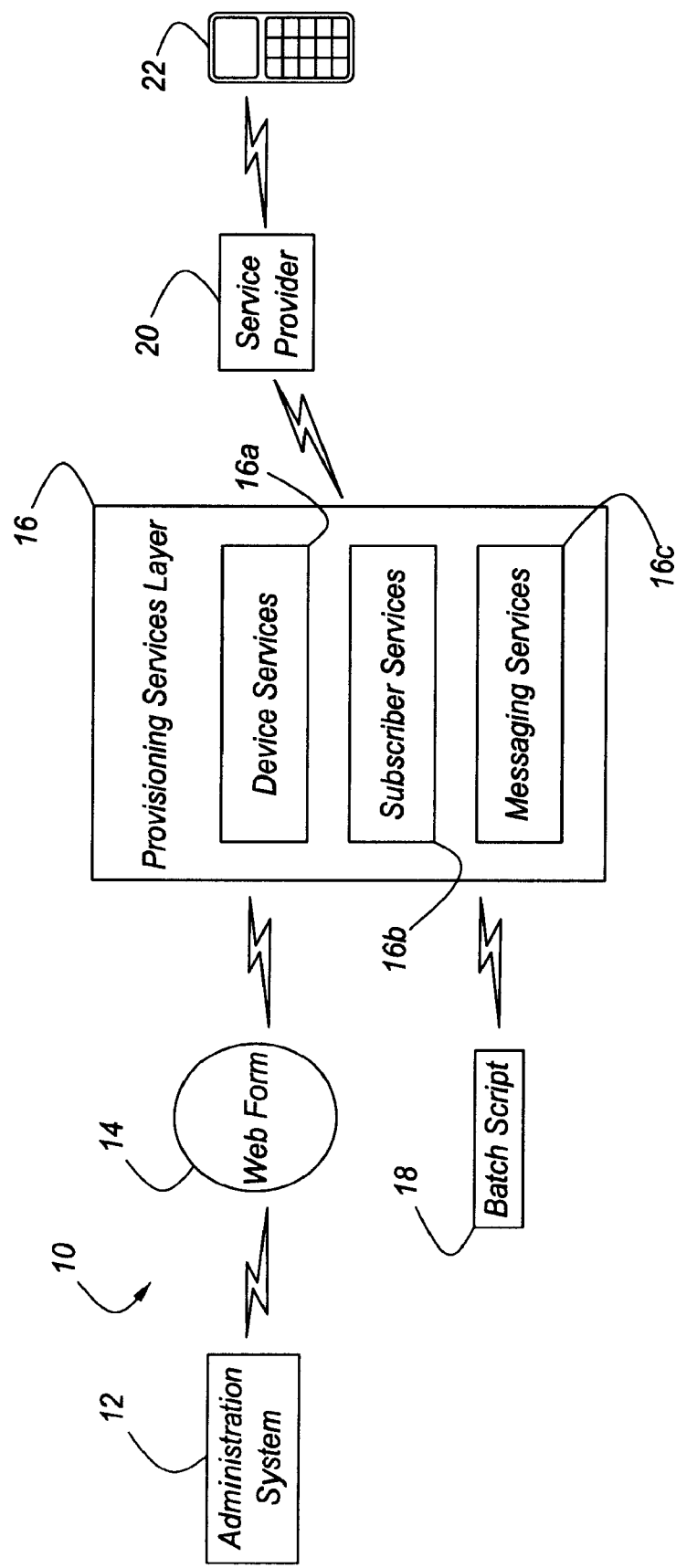
FIG. 1 illustrates a system for providing applications to an electronic device in accordance with an embodiment of the present invention.

Referring to FIG. 1, a communication system 10 is illustrated that enables a customer having a device to receive electronic applications in an efficient manner. The communication system 10 includes an administration system 12, a web form 14, a provisioning services layer 16, a batch script 18, a service provider 20 and a device 22. It is recognized that alternative embodiments may have varying configurations than those illustrated in FIG. 1 without departing from the scope of the present invention. For example, in some embodiments for automated transactions, the administration system 12 may communicate directly with the provisioning services layer 16 without utilizing the web form 14 as an interface.

The device 22 may be an electronic device including, but not limited to, a mobile telephone, a computing device, and/or a personal digital assistant (PDA). A user/system operator may utilize a graphical user interface (also referred to herein as web form 14) to enable a download to the device 22 of electronic applications including, but not limited to, an email client application, a television (TV) client application, a theme client application, and the like. Additionally, although only a single service provider 20 and a single device 22 are shown, the embodiments described herein are equally configured to generate and transmit electronic messages containing electronic applications to virtually any number of devices, which may be serviced by virtually any number of service providers.

The email client application, which may be embodied as a software application, enables the device 22 to receive, display and generate email messages. The TV client application enables video streaming to the device 22 for the viewing of TV programs including, but not limited to, cable programs. The theme client application provides a viewing environment for the device 22. For example, the theme client application may include a customized background picture that is displayed by device 22. Additionally, the theme client application is configured to enable automatic downloading of other electronic applications including, but not limited to, the email client application and the TV client application. For instance, when the theme client application is downloaded, the customer may automatically download the email client application and the TV client application upon initial use of the respective application.

The web form 14 is a user interface that is generated by a web server. In one aspect of the invention, the web server that generates web form 14 may be configured to communicate with the administration system 12 and the provisioning services layer 16. The administration system 12 may be a billing, customer order and/or an accounting system that enables creating, updating and tracking of an account(s) associated with the device 22. In one non-limiting embodiment, the administration system 12 may be an administration system for a cable service provider. Additionally, the service provider 20 may be a provider of wireless services including, but not limited to wireless phone services. Service provider 20 may have a dedicated administration system for billing and account administration that is separate from the administration system 12.

As commonly known, the customer having the device 22 typically purchases the services available through the use of the device 22. These services are tracked through the use of an account that is associated with device 22. When electronic applications are downloaded by device 22, the communication system 10 is adapted to update the account information of the account to enable optimal account administration. In some embodiments the administration system 12 has a dedicated user interface for administration of the account. The user interface of administration system 12 may be configured to redirect the system operator to the web form 14.

When downloading the applications as described herein, a reporting tool, in the form of a software application, may be programmed into the administration system 12 for providing reports on accounts associated with the device 22. For example if there are changes to the services offered via the service provider 20, the reporting tool may retrieve the corresponding data from the service provider 20 and communicate the changes to the system operator via the administration system 12. Furthermore, the communication system 10 may include a reconciliation tool that communicates with service provider 20 to reconcile and validate changes to the customer's account so as to minimize errors in the administration of the account.

Communications between the web form 14 and the service provider 20 are routed and processed through the use of the provisioning services layer 16. As shown, the provisioning services layer 16 includes a device services component 16a, a subscriber services component 16b and a messaging services component 16c. The device services component 16a, subscriber services component 16b and messaging services component 16c may be implemented via electronic software that runs on a server.

Regarding the device 22, it is recognized that the device 22 has specific device information that pertains to the device. For instance, the device information may include, but is not limited to, the make and model of the device 22. The device information may be stored within the memory of a server of provisioning services layer 16 in the form of an electronic database or file. In one embodiment, the device services component 16a provides and/or acquires the make and/or model of the device 22. The device services component 16a may also provide the capabilities of device 22 for supporting various electronic applications (e.g., email client application, TV client application and theme client application). Accordingly, via the device services component 16a, the communication system 10 may determine whether a specific electronic device supports the electronic applications.

The subscriber services component 16b enables the lookup of service information for the device 22, based on an account identification (ID) associated with the device 22. It is recognized that service information includes, but is not limited to, contact information such as phone numbers (MDNs) and the like.

The messaging services component 16c generates/transmits an electronic message(s) for the device 22. The message(s) generated for the device 22 may include a hypertext link, in the form of a uniform resource locator (URL) link, which is linked to the application to be downloaded by the device 22. In one embodiment, the electronic message may be a short message service (SMS) message that is transmitted utilizing a short message peer-to-peer (SMPP) protocol. In other embodiments, the message generated by messaging services component 16c may be transmitted utilizing the post office protocol version 3 (POP3) or a simple message transfer protocol (SMTP). It is recognized, however, that the specific communications protocols used in transmitting the message may vary without departing from the scope of the present invention. Once the device 22 receives the message, the customer may select the link within the message thereby initiating the download of the electronic application(s).

Additionally, it is recognized that in some cases a message generated by the provisioning services layer 16 may not be properly received by device 22. Accordingly, the messaging services component 16c may include an error response tool. In the event of an error in message transmission, the error response tool enables an error/fault message to be generated that is received and displayed for a system operator via the web form 14.

In some cases, as will be described below, it is desirable to generate and transmit a plurality of electronic messages in a batch. Accordingly, the provisioning services layer 16 via the messaging services component 16c may execute a batch script 18, which may be embodied as computer code. Particularly, in the event that a transmitted message is not correctly received by device 22, the communication systems 10 is configured to resend the electronic message along with other messages for other devices in a batch. In one aspect of the invention, the batch script 18 may include a batch file having data pertaining to the phone number of device 22, the make of device 22, the model of device 22, an email support flag, a TV client support flag, and a theme support flag. The flags may indicate whether the device 22 is to receive certain services (e.g., email services, TV services, and the like). In one embodiment, the administration system 12 sets the email support flag, the TV client support flag, and the theme support flag based upon the specific services purchased by the customer. The above-described data enables the proper and efficient distribution of electronic messages for the device 22.

In some instances, messages destined for the device 22 may be batched when the telephone number (or mobile directory number (MDN) in the case of mobile telephones) is to be "ported." It is recognized that "porting" occurs when a customer changes from one service provider to another but maintains the same telephone number. In such a case, the customer's telephone number should be ported from the old service provider to the new service provider.

When a customer changes service providers it is common for the customer to acquire a new telephone that would be used as the device 22. However, it is also common for there to be a delay, due to shipping, etc., between the time the service provider is changed and the time at which the customer actually receives the new telephone for use. In such a case, porting of the telephone number from the old service provider to the new service provider is delayed until the new telephone is received and activated by the customer. Accordingly, in one embodiment, the electronic message that would be generated by the messaging services component 16c, in response to a request from the administration system 12, may be batched and transmitted after a predetermined delay period. The system operator may set the delay period based on the length of an anticipated porting delay. Multiple electronic messages containing the applications may be batched and later transmitted to a plurality of devices, via the respective service providers for each device.

In an alternative embodiment, batching of electronic messages may not be required. In such an embodiment, the service provider 20 (which may be the customer's newly chosen service provider) generates an electronic report for the administration system 12 that indicates when porting of each telephone number (or MDN in the case of mobile phones) has been completed. The electronic report may be processed by the provisioning services layer 16 and/or the administration system 12. So as to not require batching of messages, the electronic message containing the embedded application(s) would be generated upon receipt of the electronic report that indicates that the porting process is complete.

As illustrated, the service provider 20 initially receives messages generated by the provisioning services layer 16. In one embodiment, the messages generated by the messaging services component 16c may be sent via the Internet to the service provider 20. The service provider 20 may then remove any unnecessary internet protocol (IP) components attached to the message. In so doing, the service provider 20 may wirelessly transmit the electronic message having the application link to the device 22. Upon receipt of the electronic message, the customer may simply select the link embedded in the message to acquire (i.e., download) the application.

Figure 2A:
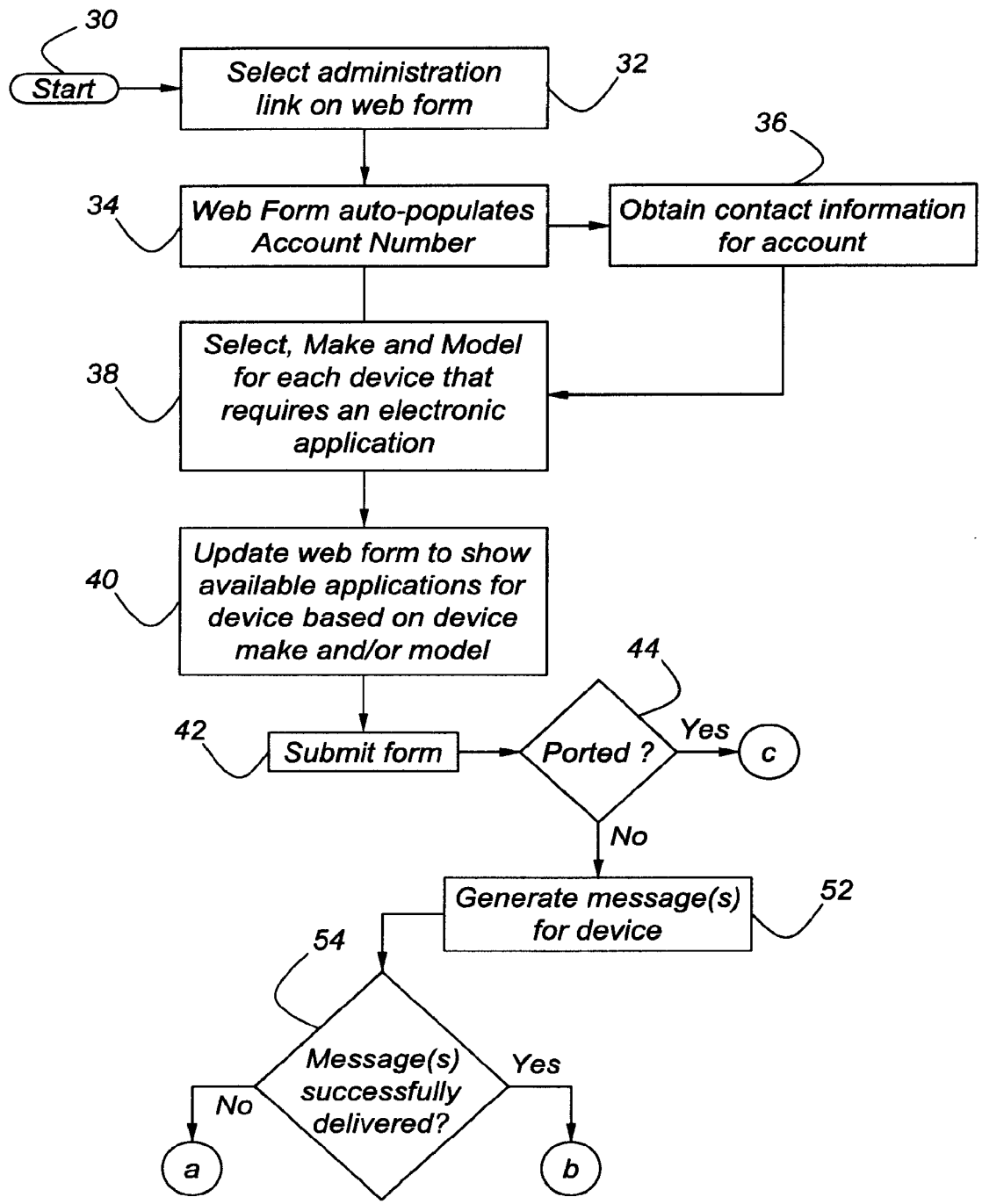
FIGS. 2A and 2B include a flow chart that illustrates a method for providing applications to an electronic device.
Figure 2B:
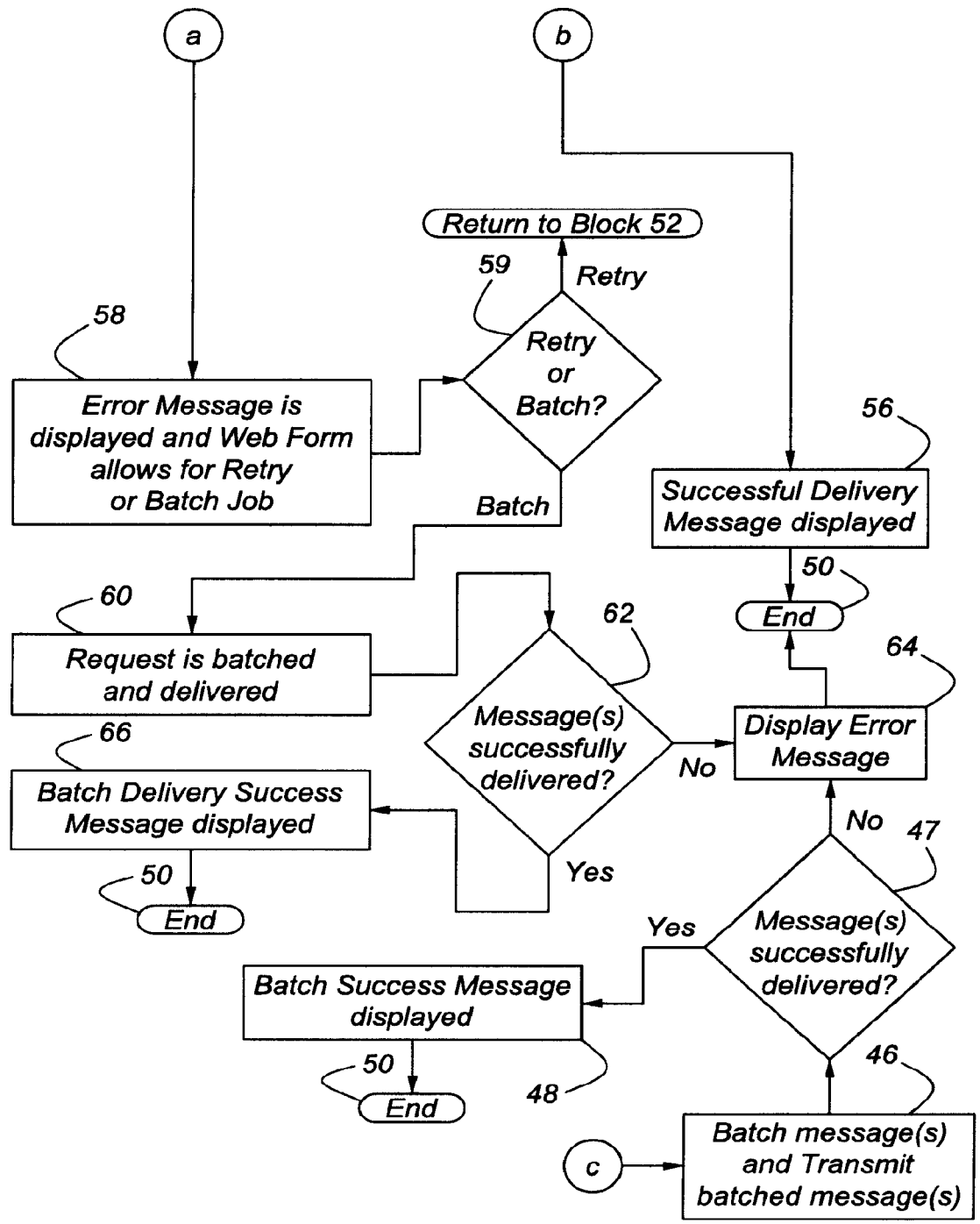

Now, referring to FIGS. 2A and 2B, a flow chart illustrates a method for providing the application(s) to an electronic device, which may be administered through the use of a user interface (web form 14). Block 30 is the entry point into the method. A system operator selects an administration link provided on the web form as shown at block 32. Block 34 depicts the automatic population of the account number field located on the web form. Automatic population of the web form enhances processing speed. Accordingly, at block 36, the contact or device information for the account that is associated with the device is acquired. As described above, the contact information may include, but is not limited to telephone numbers (e.g., MDNs) for the device. Block 38 illustrates selection of the make and model for each device that requires the electronic application. It is recognized that once the make and model for the device has been selected the web form may be automatically updated via the administration system and the provisioning services layer to show the applications that are suitable for the particular device based on the device's make and model. Accordingly, block 40 depicts updating of the web form to show the available application(s) for the specific device.

Block 42 depicts the submission of the form, which may occur by selecting a submission button on the user interface. At block 44 the method includes determining whether the request is to be sent to a telephone number which will be ported from another carrier. If the electronic message is associated with a ported telephone number, then block 46 occurs, wherein the message is batched with other messages for a batched transmission. Accordingly, the batched messages are transmitted after a delay period, as shown by block 46. Block 47 illustrates the determination of whether the messages were successfully delivered to the device. If so, block 48 occurs wherein a batched success message is displayed via the user interface. The method then terminates at block 50.

If the message is not successfully delivered as determined by block 47, an error message is displayed for the system operator, as shown by block 64. The method again terminates at block 50. It is recognized, however that at block 47 the user interface may contain a re-submission button for the system operator to resubmit the form requesting generation of the electronic message.

Referring back to block 44, if the submitted form for the electronic message is to not be ported, then a block 52 occurs wherein the message is immediately generated for the device via the provisioning services layer. Block 54 depicts the determination of whether the message was successfully delivered. If so, the method includes displaying a successful delivery message as depicted by block 56 (FIG. 2B). The method then terminates at block 50.

If the message was not successfully delivered, an error message is displayed and the web form allows for a retry or batching of the message as depicted by block 58 (FIG. 2B). Accordingly, block 59 depicts a determination of whether to retry sending the message or batch the message for delivery. If a "retry" of the delivery is selected, the method returns to block 52 (FIG. 2A). If batching of the message is selected, block 60 occurs wherein the message is batched and delivered. Accordingly, block 62 depicts the determination of whether the message was successfully delivered. If not, an error message is displayed as shown at block 64 and the method terminates at block 50. As shown, at block 66, if the message was successfully delivered, a batch delivery success message is displayed. Again, the message terminates at block 50.

Figure 3:
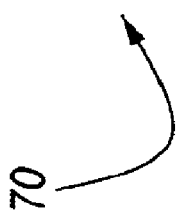
FIGS. 3-5 illustrate various graphical user interfaces in accordance with embodiments of the present invention.
Figure 4:
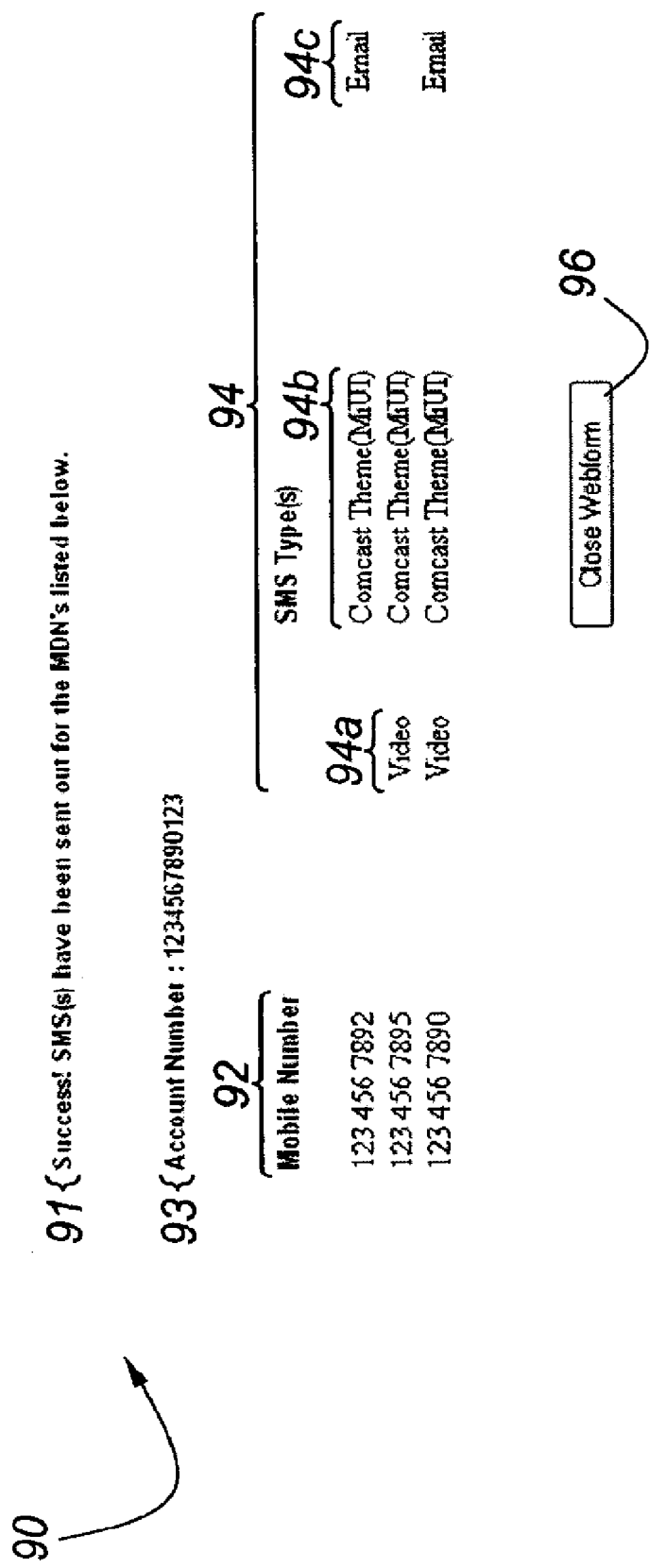
Figure 5:
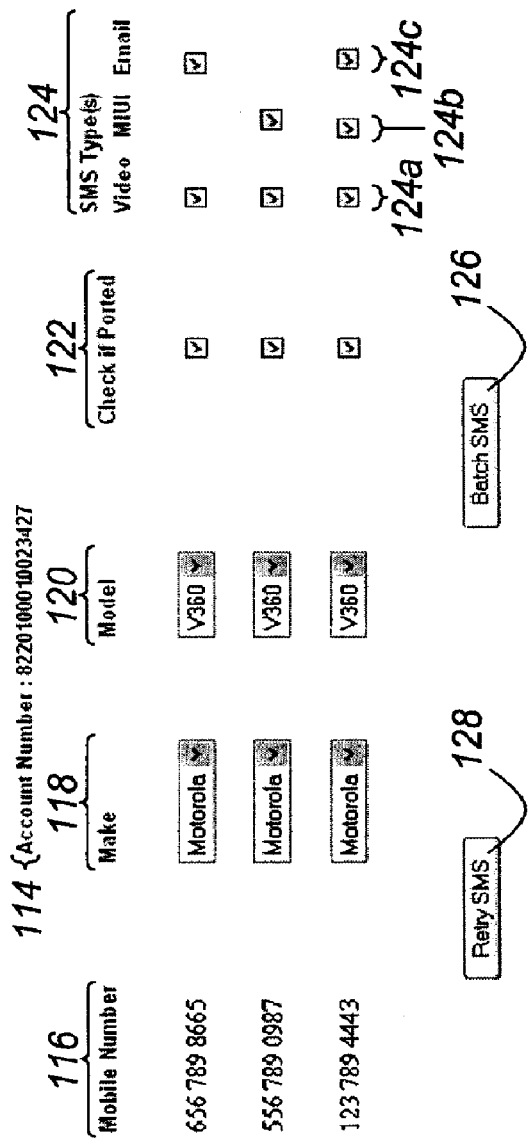

Now, referring to FIGS. 3-5, several non-limiting exemplary user interface screen shots are illustrated. FIG. 3 illustrates a user interface 70 that may be displayed via the web form when the user interface is initially displayed to the system operator. The user interface 90 (FIG. 4) includes a delivery success message in accordance with one embodiment of the present invention. The user interface 100 (FIG. 5) illustrates an error message that may be displayed when an electronic message is not successfully delivered in accordance with an embodiment of the present invention.

Specifically referring to FIG. 3, the user interface 70 includes a set of instructions as shown by a bracket 72. The system operator is provided these instructions to enable efficient and proper use of the user interface 70. It is recognized that the instructions shown in the bracket 72 are merely exemplary and may vary in alternative embodiments. A bracket 74 includes an account number for an identified account that is associated with a device.

As shown, the user interface 70 may enable the system operator to request multiple electronic messages for multiple devices that are associated with the account number shown in bracket 74. The bracket 76 includes a mobile number column wherein the contact information (i.e., phone number) for several devices that are associated with the account number (bracket 74) is shown. Bracket 78 includes a "make" column, which has a pull down menu for selecting the specific make of each mobile device identified by a mobile number in bracket 76. As such, the system operator may select the make for a specific device by selecting, via a computer peripheral, the pull down menu. Bracket 80 includes a "model" field for selecting the specific model of the device. As shown, the model of the device may be selected via a pull down menu for each respective device.

Bracket 82 includes a "ported" column that includes a check box for those devices that have been ported. Bracket 84 also includes the various application types (e.g., SMS types) that may be downloaded by the device. As shown in this embodiment, the application types include a video client application column (bracket 84a), an MIUI (i.e., theme) client application column (bracket 84b), and an email client application column (bracket 84c). Also, as shown, check boxes for each application may be displayed after the system determines the make, model and/or capabilities of the device(s) via the provisioning services layer. Once the system operator completes the form presented by the user interface 70, it may be submitted by selecting the "Send SMS" button 88. Selecting button 88 causes generation of an electronic message. However, in the event that a telephone number is ported from one service provider to another, the generation of the electronic message may be batched and transmitted after a delay period.

As described above, when the device successfully receives an electronic message, a successful delivery message may be provided to the system operator. FIG. 4 includes a non-limiting exemplary user interface 90 that illustrates a successful delivery message. Bracket 91 indicates a display message that the generated message was successfully transmitted to the device. Bracket 93 includes an account number that is associated with the device that received the electronic message containing the application(s). Bracket 92 includes a contact or device information column, which includes several mobile numbers for particular electronic devices that are associated with the account number within bracket 93. Bracket 94 includes an electronic application column that includes a TV application client column (bracket 94a), a theme application column (bracket 94b) and an email client application column (bracket 94c). As shown by the brackets 92 and 94, the first entry has received an electronic message(s) having the theme application client and the email application client. The second device as indicated by the second entry within bracket 92 has received an electronic message(s) containing the TV application client and the theme application client, as indicated in brackets 94a and 94b. Once the user interface 90 is displayed to the system operator, the system operator may exit the program by selecting the "close web form" button 96.

As described in the foregoing, when a message(s) is not successfully transmitted, an error message may be displayed for the system operator. FIG. 5 includes a user interface 100 that shows an exemplary error message. Bracket 110 includes a set of explanations for the error message including an error code and an error description. Bracket 112 includes instructions for the system operator to retry submission of the web form thereby causing generation of the electronic message(s) for the device(s). Accordingly, an account number field 114 is shown. Additionally, a contact or device information column is shown in bracket 116 along with a "make" column (bracket 118), a "model" column (bracket 120), a "ported" column (bracket 122), and an application type column (bracket 124). The application column (bracket 124) is further divided into sub-columns including a TV application column (bracket 140a), a theme application column (bracket 124b), and an email application column (bracket 124c). As shown, a number of check boxes appear that may be selected depending upon the specific make/model of the device (i.e., telephone). For example, the first device entry in bracket 116 (i.e., 656 789 8665) is to receive the video application and the email application. Once the specific applications have been selected for the respective devices, the electronic message may be generated by selecting "Retry SMS" button 128. Additionally, as described above, multiple messages may be batched together and delivered either after a delay period or immediately upon selection of a "Batch SMS" button 126.

Figure 6:
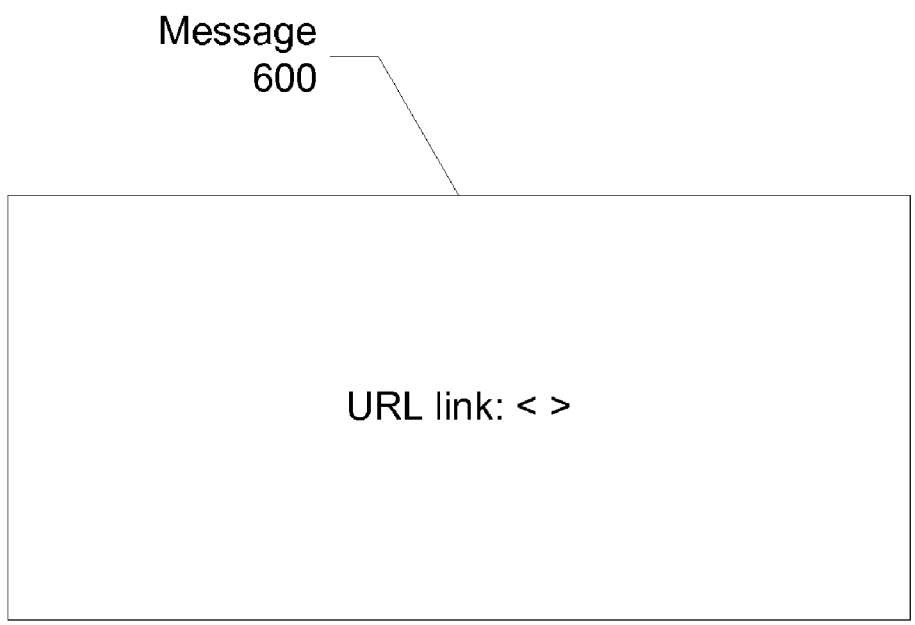
FIG. 6 illustrates a message.

FIG. 6 illustrates a message 600. Message 600 comprises a uniform resource locator (URL) link for acquiring at least one application.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, in some embodiments for automated transactions, the administration system 12 may communicate directly with the provisioning services layer 16 without utilizing the web form 14 as an interface.

What is claimed is:

1. An apparatus comprising:
a server storing software that, when executed by the server, causes the apparatus to:
transmit a message to at least one device, wherein the message comprises at least one link for acquiring at least one application;
batch the message for a second transmission responsive to determining that the transmitted message has not been received by the at least one device; and
transmit the batched message, wherein transmitting the batched message comprises transmitting a batch file including a number identifying the at least one device, an email support flag, a television (TV) support flag, and a theme support flag.

2. The apparatus of claim 1, wherein the software, when executed by the server, causes the apparatus to:
determine that a link included in the transmitted batched message is selected at the at least one device, and
transmit the at least one application to the at least one device responsive to determining that the link is selected.

3. The apparatus of claim 1, wherein the software, when executed by the server, causes the apparatus to:
generate the message.

4. The apparatus of claim 1, wherein the software, when executed by the server, causes the apparatus to:
transmit a second message to at least one other device when transmitting the batched message to the at least one device.

5. The apparatus of claim 1, wherein the software, when executed by the server, causes the apparatus to:
transmit the batched message after a predetermined delay period, wherein the predetermined delay period is based at least in part on determining that service provided by a service provider associated with the at least one device has been activated.

6. The apparatus of claim 1, wherein the software, when executed by the server, causes the apparatus to:
transmit the message to a service provider via the Internet, wherein the message comprises internet protocol (IP) components configured to be removed by the service provider.

7. A method comprising:
transmitting a message to at least one device, wherein the message comprises at least one link for acquiring at least one application;
batching the message for a second transmission on a server responsive to determining that the transmitted message has not been received by the at least one device; and
transmitting the batched message, wherein transmitting the batched message comprises transmitting a batch file including a number identifying the at least one device, an email support flag, a television (TV) support flag, and a theme support flag.

8. The method of claim 7, wherein the message comprises a short message service (SMS) message.

9. The method of claim 7, further comprising:
displaying a message received indication responsive to determining that the batched message is received at the at least one device.

* * * * *